United States Patent
Schorter et al.

(10) Patent No.: US 9,924,212 B2
(45) Date of Patent: Mar. 20, 2018

(54) METHOD FOR GENERATING A MENU FOR PRESENTING AUDIOVISUAL PROGRAMS PAID FOR BY SEVERAL USERS, DEVICE AND COMPUTER PROGRAM FOR IMPLEMENTING THE METHOD

(71) Applicant: Orange, Paris (FR)

(72) Inventors: Loic Schorter, Paris (FR); Jerome Gatefin, Clamart (FR); Camille Duperray, Paris (FR); Wojtek Nowak, Montrouge (FR)

(73) Assignee: ORANGE, Paris (FR)

( * ) Notice: Subject to any disclaimer, the term of this patent is extended or adjusted under 35 U.S.C. 154(b) by 91 days.

(21) Appl. No.: 14/150,442

(22) Filed: Jan. 8, 2014

(65) Prior Publication Data

US 2014/0196063 A1 Jul. 10, 2014

(30) Foreign Application Priority Data

Jan. 8, 2013 (FR) .................................... 13 50139
Feb. 15, 2013 (FR) .................................... 13 51302

(51) Int. Cl.
*H04N 21/2543* (2011.01)
*H04N 21/482* (2011.01)
(Continued)

(52) U.S. Cl.
CPC ..... *H04N 21/2543* (2013.01); *G06Q 30/0601* (2013.01); *G06Q 30/0603* (2013.01);
(Continued)

(58) Field of Classification Search
CPC ........... H04N 21/2543; H04N 21/4147; H04N 21/4312; H04N 21/4622; H04N 21/482;
(Continued)

(56) References Cited

U.S. PATENT DOCUMENTS

2003/0002862 A1  1/2003 Rodriguez et al.
2004/0244030 A1* 12/2004 Boyce et al. ................... 725/25
(Continued)

FOREIGN PATENT DOCUMENTS

EP 1361759 A1 11/2003

OTHER PUBLICATIONS

French Search Report and Written Opinion dated Aug. 27, 2013 for corresponding French Application No. 1350139, filed Jan. 8, 2013.

(Continued)

*Primary Examiner* — Rong Le
(74) *Attorney, Agent, or Firm* — David D. Brush; Westman, Champlin & Koehler, P.A.

(57) ABSTRACT

A method is provided for generating a presentation menu for presenting audio and audiovisual contents on the screen of a receiver, which are downloadable from a broadcasting network or from dedicated sites. A user selects accessible contents and makes payment to make these contents available at the receiver. The receiver retrieves information on availability of all the contents from the receiver and requests display of a presentation menu presenting a list of available contents. Thus each user gets to know all the available contents from the receiver, including those purchased by other users. The presentation menu can visually associate each document with the identity of the user who made the document available. The presentation menu can display an indication that the replay of an available content has already begun and has been interrupted at a certain point in time. This point in time is made available at the display.

19 Claims, 3 Drawing Sheets

(51) Int. Cl.
*G06Q 30/06* (2012.01)
*H04N 21/4147* (2011.01)
*H04N 21/431* (2011.01)
*H04N 21/462* (2011.01)

(52) U.S. Cl.
CPC ..... *H04N 21/4147* (2013.01); *H04N 21/4312* (2013.01); *H04N 21/4622* (2013.01); *H04N 21/482* (2013.01)

(58) Field of Classification Search
CPC ...... H04N 7/166; H04N 7/167; H04N 7/1675; H04N 7/169; H04N 7/1693; H04N 7/1716; H04N 7/1696; H04N 7/1713
See application file for complete search history.

(56) References Cited

U.S. PATENT DOCUMENTS

| | | | |
|---|---|---|---|
| 2009/0031374 A1* | 1/2009 | Choi | 725/104 |
| 2010/0192175 A1* | 7/2010 | Bachet et al. | 725/31 |
| 2010/0192180 A1* | 7/2010 | Olague et al. | 725/42 |
| 2011/0202948 A1* | 8/2011 | Bildgen | G06F 21/10 725/14 |
| 2014/0007155 A1* | 1/2014 | Vemparala et al. | 725/32 |

OTHER PUBLICATIONS

English translation of the French Written Opinion dated Aug. 27, 2013 for corresponding French Application No. 1350139, filed Jan. 8, 2013.

* cited by examiner

METHOD FOR GENERATING A MENU FOR PRESENTING AUDIOVISUAL PROGRAMS PAID FOR BY SEVERAL USERS, DEVICE AND COMPUTER PROGRAM FOR IMPLEMENTING THE METHOD

1. FIELD OF THE INVENTION

The invention pertains to a method for generating a menu for presenting audiovisual programs in an audiovisual receiver and a receiver provided with such a method for generating. The invention is applicable especially when access to audiovisual programs is paid for and acquired by several users.

2. PRIOR ART

At present, a digital broadcasting network transmits audio or audiovisual programs that are to be replayed in receivers as well as service data indicating especially the programs that are currently being broadcast and will be broadcast in coming days. An electronic program guide retrieves the service data and displays a selection menu on a screen. This menu presents the user with the programs currently being broadcast on channels accessible by the receiver. Said guide has means for browsing and selecting a given program.

These programs are listed in a table containing pieces of information that characterize them, such as: the program title, the time and date of broadcast, the broadcasting channel, the type of subscription, the language, the level of parental control, etc. The access to a document can be pay access. In this case, the document can be part of the subscription that the user generally pays for each month. Or else the document is purchased independently of any other program. The latter service, better known as VOD (Video On Demand), enables a user to download a content on a one-time basis and/or to replay it during a determined period. Thus, a user can purchase access to a film for 24 hours and request the server to transmit this document as many times as he wishes it during the 24 hours that follow the purchase.

When several users share a same receiver, they can acquire replay rights independently of one another. If the users do not communicate with one another and exchange information about the documents that have been effectively purchased, a user does not know about the acquisitions made by the other users and is unaware of all the audiovisual or visual programs currently available from this receiver. In the worst case, the user could acquire rights to access a program which another user has already purchased for the same receiver. There is therefore a real need for an ergonomical and user-friendly interface enabling the presentation of audio or audiovisual contents that are available from a receiver and to achieve this result whatever the means that have made them available.

3. SUMMARY OF THE INVENTION

Indeed, according to a functional aspect, the invention pertains to a method for generating a menu for presenting audio or audiovisual contents accessible by at least one digital network. The method comprises a step for receiving a set of identifiers of accessible contents capable, after payment, of being available at a receiver. The method further comprises a step for retrieving information on the availability of all the contents from the receiver and a step for generating signals for displaying a menu capable of presenting a list of all of said available contents.

In this way, all the contents available from the receiver are visible on a same presentation menu.

It must be noted that the accessible contents can be made available by a same person or by a plurality of persons. The receiver can be a single receiver or can be included in a set of receivers belonging to a same group of users, for example a family, a company, etc. The set of receivers includes for example at least one decoder and/or at least one smartphone and/or at least one tablet, etc.

The different particular embodiments mentioned here below can be added independently or in combination with one another to the steps of the method for generating defined here above.

According to one particular embodiment, the payment is done by several users making available certain contents for each of the users.

In this way, several users can obtain knowledge of all the contents available from a same receiver including those purchased by other users.

According to another particular embodiment, each document is visually associated at display with the identity of the user who has made said document available. In this way, a user is informed of the identity of the user who has purchased the content.

According to another embodiment, the payments are made by different payment means. In this way, each user can use his payment means to make the desired content available.

According to another embodiment, the list of available contents is ordered at display according to the users who have paid for said contents. In this way, the user can immediately see the groups of documents that the different users have purchased.

According to another embodiment, the payments associated with the available contents are managed by a server distinct from the receiver used for the replay of the contents. In this way, this server centralizes the information on availability on all the contents from the determined receiver and is capable of giving said information on demand.

According to another embodiment, an available content is downloaded into the memory of a receiver intended to replay it, and said content is erased from the memory of the receiver when the duration of availability of this content has elapsed. In this way, the memory of the receiver can be devoted to the downloading of other contents.

According to another embodiment, the replay of an available document can be interrupted on demand by the user, and the replay is resumed for a predetermined duration before the point at which the replay was interrupted. In this way, the user can go back a little in time and thus better recollect what happened immediately before the interruption.

According to one particular embodiment, the list of available contents is stored in a smart card, the display including a step for reading data memorized in the card to display the list of available contents on a receiver that is a reader of said card. In this way, each user can introduce his smart card into the receiver and thus communicate his access rights which get grouped together with those already memorized in the receiver.

According to another hardware aspect, the invention also pertains to a receiver comprising a means for generating a menu for presenting audio or audiovisual contents accessible by at least one digital network. The receiver also has a means for receiving a set of identifiers of accessible contents and at least one means for paying to make available certain contents. The receiver also has a means for retrieving information on availability of all the contents from the receiver, said means for generating signals for displaying a menu being capable of presenting a list of all of said available contents.

According to another hardware aspect, the invention also pertains to a computer program comprising program code instructions for implementing a step for generating a menu for selecting as described further above when this program is executed by a processor.

4. LIST OF FIGURES

Other features and advantages of the invention shall now appear in greater detail in the context of the description that follows of examples of embodiments given by way of a non-exhaustive illustration with reference to the appended figures, of which.

5. DESCRIPTION OF ONE EMBODIMENT OF THE INVENTION

5.1 General Principle

The invention pertains to a method for the generating, by means of a receiver such as a home gateway or a decoder, a digital tablet, a smartphone, etc., of a menu for presenting audio and/or audiovisual contents.

These contents are downloadable from a broadcasting network or from dedicated sites. A plurality of users select accessible contents and make payment in order to make these contents available at the receiver. The receiver retrieves the information on availability of all the contents from the receiver and requests the display of a presentation menu presenting a list of available contents. The resulting presentation menu visually associates each document with the identity of the user who has made said document available. The presentation menu displays an indication concerning the fact that the replay of an available content has already begun and has been interrupted at a certain point in time. This point in time is made visible at the display. The user requests the downloading of the selected content on his receiver and the receiver checks to see if the local replay is truly done within the authorized period of time.

5.2 Description of One Preferred Embodiment

Figure 1:
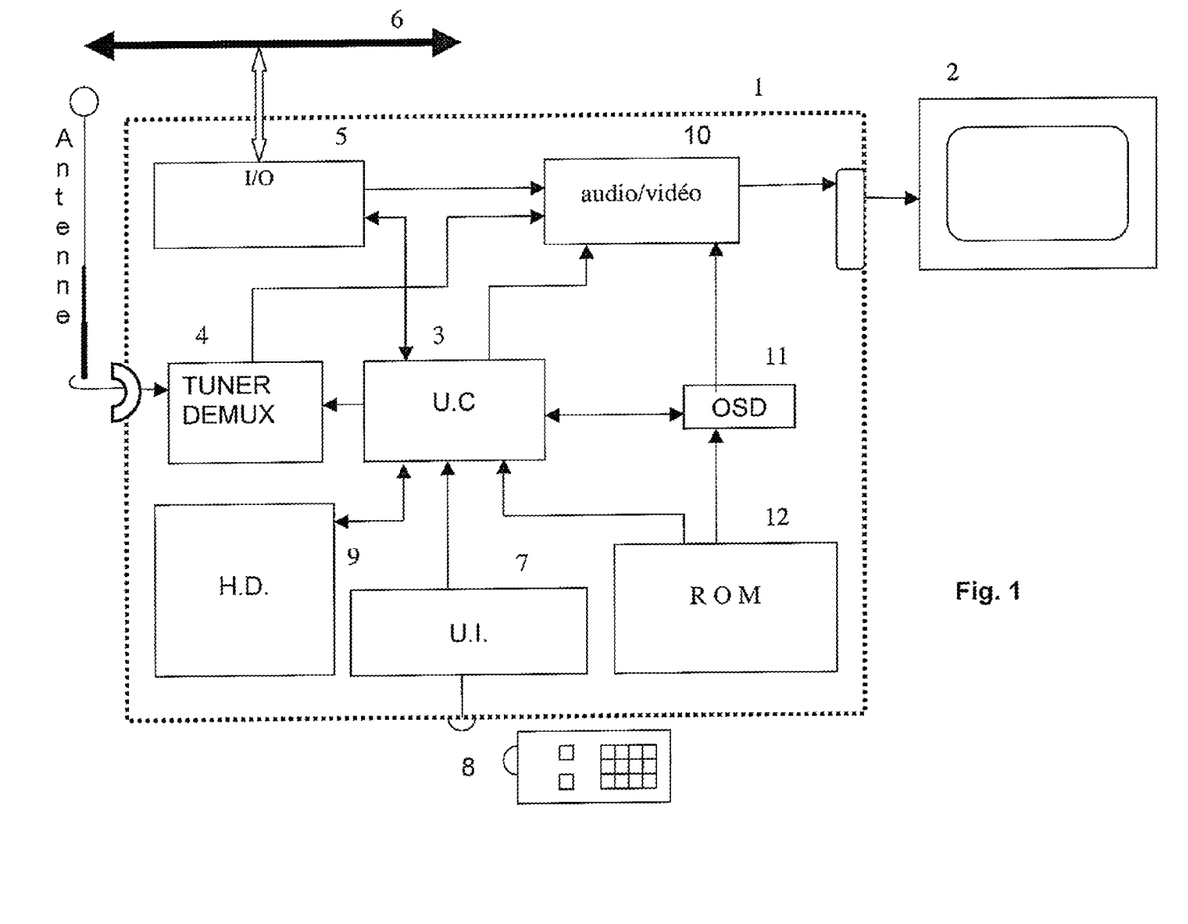
FIG. 1 is a block diagram of an audiovisual receiver for implementing an example of an embodiment of the invention.

FIG. 1 presents the elements of an audiovisual receiver 1 provided with a display device 2 according to one example of an embodiment of the invention. The audiovisual receiver 1, for example a decoder known as a set-top box comprises a central processing unit 3 connected to a program memory 12, means for receiving such as a demodulator 4 and a demultiplexer to receive audio/video data from a broadcasting network through a receiver antenna. As a variant, the audiovisual receiver 1 and the display device 2 are integrated into a same receiver which is for example a laptop computer. As a variant, in addition, the receiver 1 can be given an interface 5 for communications with a high-bandwidth digital network 6 enabling the transmission of the audiovisual data in real time, possibly through a modem. The network 6 is typically the Internet. The central processing unit has available high processing power in order to decode the image data and generate display signals. The receiver 1 furthermore comprises a user interface 7 comprising an infrared signal receiver to receive the signals from a remote control unit 8, a memory 9 for storing service data (typically a hard disk drive or HDD) and an audio/video decoding logic program 10 for generating audiovisual signals sent to the screen 2. The remote control unit is provided with direction arrows ↑, ↓, →, ← and other keys such as "CG", "Selection", "Exit", "download", "payment", etc., whose role shall be seen further below in the description. According to one alternative embodiment, the interface is constituted by a touchscreen. In this case, the receiver 1 can be a smartphone, or a touch pad or touch tablet. According to another alternative embodiment, the user interface 7 has a mouse driving the movements of a cursor on the screen 2. The mouse has keys enabling the user to select an icon placed beneath the cursor and to introduce a validation command. The icons are associated with the same names as those of remote control keys listed further above. According to another alternative embodiment, the receiver has a voice recognition module enabling the commands for selection, validation and cursor movement to be entered by voice.

The receiver 1 also has a circuit 10 for the direct display of audiovisual broadcasts received by the broadcasting network or by the digital network 6 and a circuit 11 for the overlay of data often called an OSD "on screen display". The OSD circuit 11 is a generator of text and graphics used to display menus, pictograms (for example a logo corresponding to the channel being viewed) and images on the screen and enabling the updating of the presentation menu according to the present invention. The OSD circuit is controlled by the central processing unit 3 and a contents guide (CG) application contained in the memory 12. The CG application can be resident in a ROM or downloaded or recorded in a writable memory. In one variant, the CG application is in the form of a specialized circuit, an ASIC type for example, implemented in the receiver 1. The receiver 1 has means available for acquiring access rights to documents. According to a first embodiment, these means consist in identifying the person using the receiver and searching for all the documents available through his subscription. In another embodiment, payment means (a bankcard reader for example) are available at the receiver, and the access rights to a document are purchased by using the receiver 1.

The network (terrestrial, satellite or cable) broadcasts audio and/or audiovisual programs more commonly called service programs and data intended to reference them. These data are defined for example in EN 300 468 V1.3.1, DVB-SI (Digital Video Broadcast—Service Information Specification) (published by the ETSI). They take the form of tables and descriptors which describe the objects sent on a network. A service is an uninterrupted sequence of events broadcast on a determined stream.

Typically, the following tables are found in streams compliant with the DVB-SI standard: NIT, SDT, EIT, PAT, PMT and possibly BAT tables. The NIT table defines the general structure of the network and indicates the list of transport streams and services broadcast. The SDT table gives additional information on services, for example the name of a service in unencrypted or clear form. The ETT table indicates a list of events for each service. They make it possible especially to indicate the event being broadcast. The PAT table associates a PMT table with a service. The PMT table contains the list of elementary streams contained in a service (list of audio, video languages, available subtitles, etc) and contains all the information needed to select this service with the desired elementary streams (a PID identifies each elementary stream of the service). The BAT table for its part brings together several services into a bouquet of services which can come from several broadcasting networks. When the services are installed, the receiver 1 filters the NIT table to extract information therefrom on the channels of the network and then the receiver will get positioned on each channel to extract the SDT table from it in order to retrieve the list of services with their names and their identifiers. At the end of the installation, the receiver 1 has a list of services in its memory 9. For each of them, it has a single identifier: the DVB triplet. The three components of a service are: the identifier of the network, the identifier of the frequency channel and the identifier of the service broadcast on this channel. The triplet is called (OriginalNetworkId, TransportStreamId, ServiceId) in the above-mentioned standard. Using the PAT and PMT tables broadcasting lists of DVB triplets, the receiver 1 is capable of searching for the stream that broadcasts the service desired by the user. The CG application can thus receive the information of the broadcast programs and program the downloading of the program selected by the user.

Figure 2:
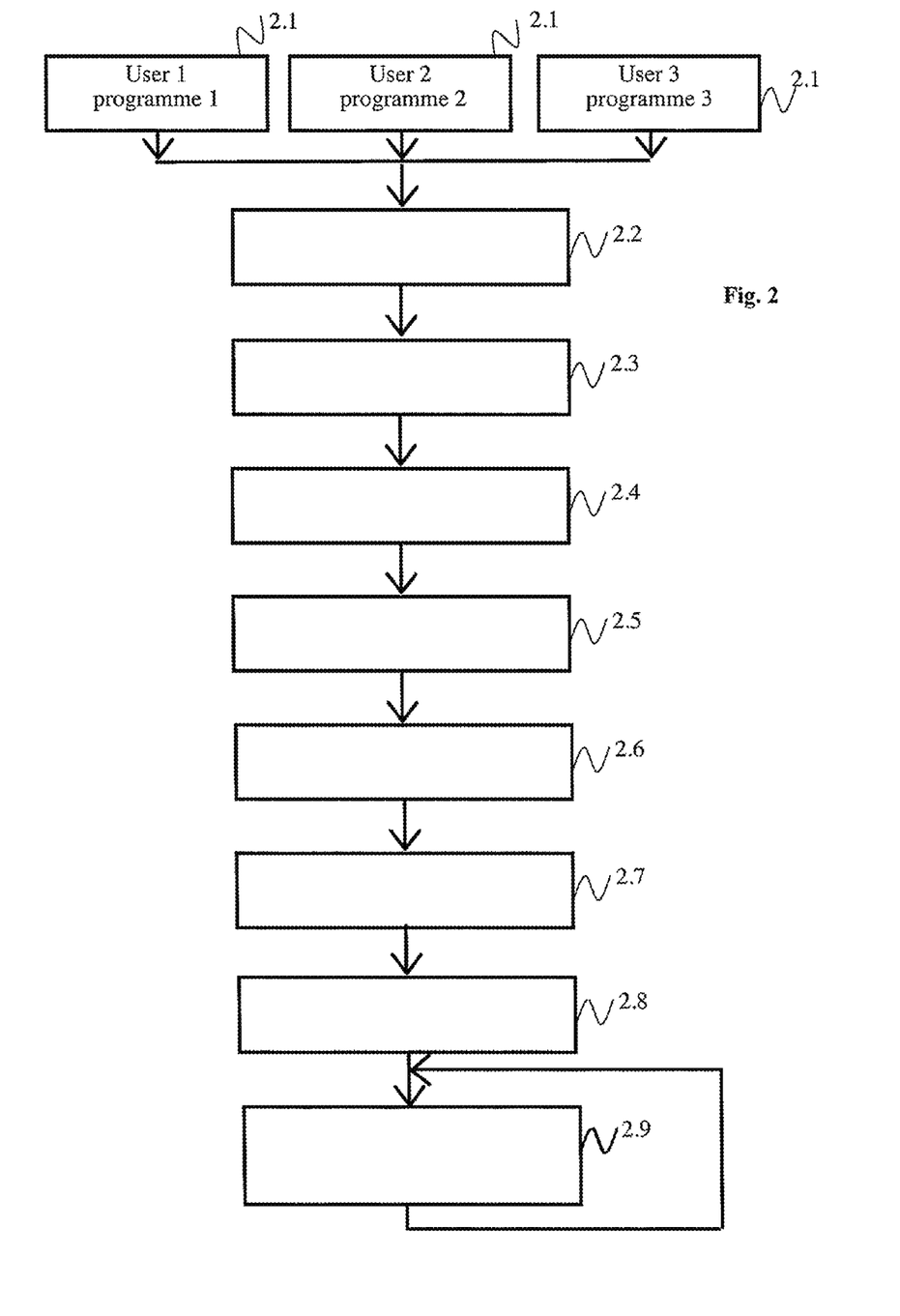
FIG. 2 presents a flow chart of the steps of the method according to one example of an embodiment of the invention.

Using the flowchart of FIG. 2, an example shall now be described of the running of operations enabling a user to select contents, download them and replay them. In this example, the contents are made available by a plurality of users of the receiver. It may be recalled however that the invention can be applied to the case where only one user makes a content available. It may finally be recalled that the menu generated according to the invention is accessible by a user, or even several users, of a same group of users, for example a family. Initially, steps 2.1 are performed enabling different users to acquire rights of access to a plurality of audio or audiovisual documents, these rights of access being generally associated with a duration of availability. The payment means used by each user can be different (bankcard, subscriptions, VOD, etc.). These rights of access are associated with the receiver 1 which can receive and replay said purchased documents.

In a second stage, a user wishes to know all the documents, accessible from this receiver 1, that he can especially replay. At the step 2.2, he launches the CG application by pressing the corresponding key on his remote control unit or by activating the icon or by voice if the receiver 1 is provided with voice recognition. The launching of the application is done in a secured way, with the user introducing an identifier and a code. The CG application retrieves the pieces of information on the contents accessible at the receiver from various catalogues available at the accessible networks (step 2.3). The retrieval of the information is done for example by analyzing the tables transmitted on an audiovisual service and received by the tuner 4 and by determining the list of documents broadcast by the network 1. The CG application also sends out requests through the I/O module 5 to question the remote servers of content editors in order to know the accessibility of the contents and at their price. The list of remote servers is memorized in the receiver 1 and can be modified by means of a configuration menu of the CG application. At the step 2.4, the CG application sends out a request on the state of the paid contents to a paid contents management server (PCMS). In return, the receiver 1 receives the list of contents for which a user of the receiver 1 has acquired rights and which can be replayed on the receiver 1 without additional payment. To clarify the rest of this document, a content is said to be "accessible" when it can be transmitted to the receiver 1 in return for payment and is said to be "available" when access to this content is already paid for or is free. It can then be replayed on this receiver.

At the step 2.5, the CG application has information available on the accessible and available documents with a view to generating a presentation menu. The receiver sends display signals representing a menu intended for the screen 2.

The menu displayed on the screen provides the user with information such as:
  the list of accessible contents,
  the price for downloading the accessible contents and the duration of accessibility,
  the list of contents available on the receiver 1 because they are already paid for,
  the duration of the availability of these contents.

Other additional information can be displayed, for example:
  the source (broadcast network, website) of the accessible contents,
  the duration during which the contents are available at the price indicated,
  an indication that the available content is stored locally in the receiver 1,
  an indication that the replay of an available content has started,
  a list of selected contents, access to which has not been paid for,
  the identity of the user who has acquired rights for each content.

Other types of displayable information are possible.

Then, the CG application waits for a command from the user. The user can browse through the lists displayed and, at the step 2.6, place the focus on the identifier of a content to which he wishes access. Once the focus has been positioned on the identifier of the desired content, the user validates his choice and launches the payment step (step 2.7). The payment is done according to a technique known per se that does not need to be described in greater detail.

Once the payment has been made, at the step 2.8, the server which validates the payment sends out a receipt attesting to the payment and informs the PCMS server that the content is henceforth available on the receiver. Optionally, a transfer of the content into the memory 9 of the receiver can be activated. This transfer enables the launching, under control of the CG application, of the local replay of a downloaded content.

So long as the presentation menu remains on the screen, the CG application is kept active and manages the information displayed in real time. As a result, if the content ceases to be available because the time limit of availability has expired, the CG application erases it from the list of available contents. In this way, the user is constantly informed of the contents truly available at the level of his receiver 1 and this is the case whichever the user who has enabled them to be made available. According to one improvement, the CG application eliminates a downloaded content, whose availability has lapsed, from the memory 9 of the receiver (step 2.9). In this way, the memory of the receiver can be used for downloading other contents.

Figure 3:
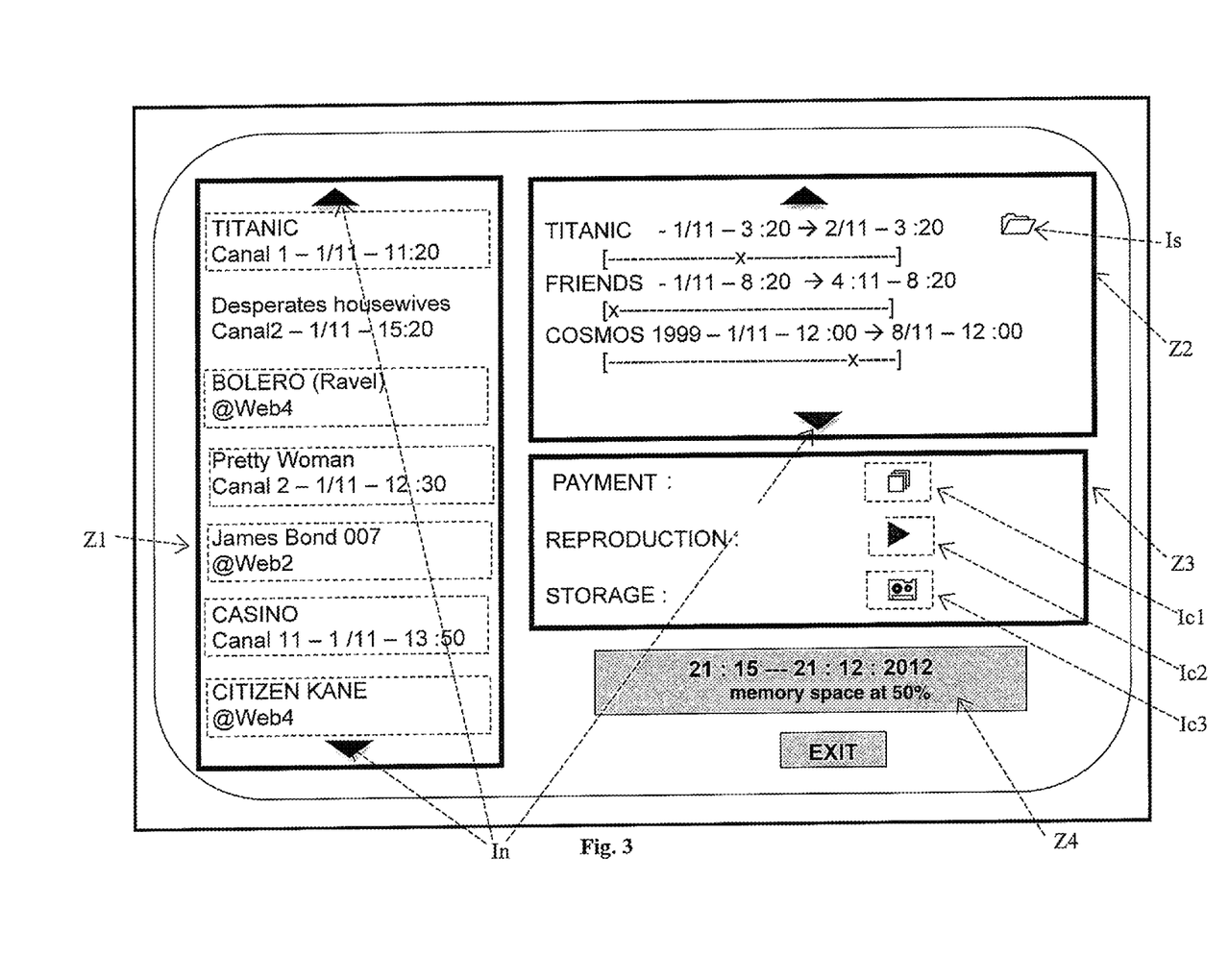
FIG. 3 illustrates a particular example of at least one presentation enabling the user to select audiovisual contents and to replay them.

FIG. 3 shows another particular example of a presentation menu enabling the user to select audiovisual contents and replay them. The content of the displayed menus can considerably vary especially according to the size of the screen.

The accessible audiovisual or audio contents are present in a zone Z1 in the form of selectable icons. The icon represents a box typically containing the title of the content and an image, for example the display of the broadcast. Possibly, the icon also contains the source enabling the downloading of this content and its price. Browsing icons In are used to make the list scroll. The box identifying a content that possesses the focus appears with a graphic distinction such as highlighting, blinking, a special color, etc.

A zone Z2 presents all the available contents. According to one alternative embodiment, the zone Z2 is enlarged and fills a large part of the payload surface of the screen 2, the zone Z1 being no longer displayed. In this way, the user can more easily obtain knowledge of all the contents available from the receiver 1. The identification of these contents is preferably the same as in Z1: title, image, etc. The identifier is associated with an indication of information of availability of the contents such as for example information on a time slot indicating the duration of availability of the content. This time slot is for example indicated by a starting date and time and an end date and time. As a variant, the zone Z2 indicates the remaining duration of the availability of this content. The identifier is also associated with an indication that the replay of this content has already begun. This indication is advantageously provided by a text of the following type: "replay has started since 30 minutes, 15 seconds". The indication can also be displayed in the form of a timeline representing the content with an index placed on the line that represents the moment of its interruption. Since the availability of the displayed content is continuously updated in the menu, it is not possible to launch the replay of a content for which the duration of availability has elapsed, in selecting by its icon in Z2.

According to one particular embodiment, the identifier of the content is also associated with the identity of the user who has acquired rights of access to this content. This identifier is for example the surname and first name of the user. In this way, the user can know the contents that he has recently acquired. He is also informed of the acquisitions made by other the users by identifying these users.

According to one particular embodiment, the available contents displayed in the zone Z2 are ordered according to the users initiating the access rights. Thus, it is possible to immediately see the groups of documents that the different users have purchased. The identifier can also be associated with an icon Is indicating that the content is memorized in the receiver. This informs the user that its replay will not require any loading time, the content being already in its receiver, and that it does not need to be downloaded from a network. As stated previously, the CG application updates the contents of the Z2 and routinely erases the contents that are no longer available.

A zone Z3 contains control icons. This zone Z3 can be avoided if the remote control unit 8 has keys available activating the same actions. The zone Z3 comprises an icon Ic1 to activate the payment of a content, the identifier of which possesses the focus. When the user activates this icon, a menu appears in an overlay enabling the user to make payment. Then, the content appears in the zone Z2 thus showing that this content has become available. The zone Z3 also contains an icon Ic2 to activate the replay of a content, the identifier of which, in Z2, possesses the focus. According to one improvement, if the replay of this content already begun, it starts again from a short lapse of time before the instant at which it is stopped. This lapse of time is for example 30 seconds. This lapse of time can be modified by the user using a configuration menu. Thus, this lapse of time can be made to be equal to zero.

The zone Z3 also contains an icon Ic3 to activate the local storage of a content for which the identifier in Z1 possesses the focus and which has just been paid for. The user can also activate the storage locally for a document available whose identifier appears with the focus in the zone Z2. Similarly, the user, by selecting the icon Ic3 for the second time with the focus placed on a content in Z2, activates the erasure of this content in the local memory. In this way, the user can easily manage his memory space.

The presentation menu also has a status zone Z4. This zone typically displays the current time and date and possibly the rate of loading of the memory 9. This indication is useful if the user wishes to store a content locally. He can thus verify that the operation is possible. Finally, the presentation menu has an "EXIT" icon to exit the menu and close the execution of the application, and a "CONFIG" icon to access a configuration menu.

The presentation menu also has a zone listing preferred contents (not shown in FIG. 3). The identifiers of the visible contents in this zone are associated with an indicator showing whether the payment has been made or not. This zone enables the user to rapidly "set aside" certain contents and to determine later if he really wishes to pay for the acquisition of the associated rights.

5.3 Description of an Alternative Embodiment

According to one particular embodiment of the invention, the CG application can be downloaded into audiovisual terminals from a dedicated site. Once launched, the user authenticates himself by introducing an identifier and a secret code. In one variant, the receiver has a smartcard reader available. The user introduces a private card which contains his identifier and his rights. He then introduces his code. In this way, the user can start replaying a content on a given receiver and stop the replay. Then he authenticates himself on another receiver having the CG application available and launches the replay of the document from the instant at which this application had been interrupted. Using this other receiver, he can also consult all the contents available that appeared in the zone Z2 and launch a replay of a content at its start.

An exemplary embodiment provides a novel user interface enabling the selection of an audiovisual program by using a selection menu having a plurality of programs available in a receiver.

Although the present invention has been described with reference to the particular embodiments illustrated, it is in no way limited by these embodiments but is limited only by the appended drawings. It can be noted that changes or modifications could be made by those skilled in the art.

The invention claimed is:

1. A method for generating a menu for presenting audio or audiovisual contents accessible by at least one digital network by an audio or audiovisual receiver, the method comprising the following acts performed by the receiver:

receiving a set of identifiers of accessible contents and a plurality of access rights acquired by several users through a plurality of payments, thereby making available certain contents for each of said users at the receiver, the access rights being associated with at least one time slot defining the availability of associated content;

a plurality of previous stages of retrieving from at least one non-transitory computer-readable medium the access rights of all the contents currently available from the receiver for each of said users;

a subsequent stage of grouping the access rights for all of said several users to determine all of the contents currently available from the receiver, such that the content acquired by a first user at the receiver is made available to a second, different user at the receiver;

generating signals for displaying on a display a menu presenting a list of all of said currently available contents for the grouped access rights, the list of contents being updated to indicate the availability of all content determined from time slots associated with access rights;

sending the display signals to the display;

receiving a selection of a content in the displayed list through a user interface; and authenticating at least one user of the plurality of users before presentation of the content selected in the displayed list.

2. The method for generating a menu according to claim 1, wherein the display visually associates each content with an identity of a user who has made said content currently available from the receiver.

3. The method for generating a menu according to claim 1, wherein the currently available contents are displayed in a sequence according to payments made by the users for said contents.

4. The method for generating a menu according to claim 1, wherein the method comprises managing acquisitions of access rights associated with the available contents, implemented by a server distinct from the receiver used for replay of the contents.

5. The method for generating a menu according to claim 1, comprising downloading an available content into a memory of the receiver and erasing said content from the memory of the receiver when a duration of availability of this content has elapsed.

6. The method for generating a menu according to claim 1, wherein the method comprises interrupting a replay of an available content and resuming the replay for a predetermined duration before a point at which the replay was interrupted.

7. The method for generating a menu according to claim 1, wherein the list of available contents is stored in a smart card, and wherein displaying includes reading data memorized in the card to display the list of available contents.

8. The method for generating a menu according to claim 1, wherein the displayed list of available contents comprises at least one indication pertaining to information elements on availability.

9. An audiovisual receiver comprising:
a non-transitory computer-readable medium comprising program code instructions stored thereon; and
a central processing unit configured by the instructions to:
control generation of a menu for presenting audio or audiovisual contents accessible by at least one digital network;
receive a set of identifiers of the accessible contents;
acquire access rights made by several users through a plurality of payments, to thereby make available certain contents at the receiver, the access rights being associated with at least one time slot defining the availability of associated content;
retrieve from at least one non-transitory computer-readable medium the access rights of all the contents currently available from the receiver for each of said users;
group the access rights previously retrieved to determine all of the contents currently available from the receiver for the several users, such that the content acquired by a first user at the receiver is made available to a second, different user at the receiver;
control display of a list of all of said currently available contents for the grouped access rights on a display, the list of contents being updated to indicate the availability of all content determined from time slots associated with access rights;
send the display signals to the display;
receive a selection of a content in the displayed list through a user interface; and
authenticate at least one user of the plurality of users before presentation of the content selected in the displayed list.

10. The audiovisual receiver according to claim 9, wherein the central processing unit is further configured to control display of the list of all of said currently available contents with the display visually associating each content with an identity of a user who has made said content currently available from the receiver.

11. The audiovisual receiver according to claim 9, wherein the central processing unit is further configured to control display of the list of all of said currently available contents in a sequence according to payments made by the users for said contents.

12. The audiovisual receiver according to claim 9, wherein the central processing unit is further configured to download an available content into a memory of the receiver, and erase said content from the memory of the receiver when a duration of availability of this content has elapsed.

13. The audiovisual receiver according to claim 9, wherein the central processing unit is further configured to interrupt a replay of an available content and resume the replay for a predetermined duration before a point at which the replay was interrupted.

14. The audiovisual receiver according to claim 9, wherein the list of available contents is stored in a smart card, and wherein the central processing unit is further configured to read data memorized in the card to display the list of available contents.

15. The audiovisual receiver according to claim 9, wherein the displayed list of available contents comprises at least one indication pertaining to information elements on availability.

16. A non-transitory computer-readable memory comprising a computer program stored thereon, which comprises program code instructions for implementing a method generating a menu for presenting audio or audiovisual contents accessible by at least one digital network, when this program is executed by a processor of an audio or audiovisual receiver, wherein the method comprises the following acts performed by the receiver:
receiving a set of identifiers of accessible contents and a plurality of acquisitions of access rights acquired by several users through a plurality of payments, thereby making available certain contents for each said users at a receiver, the access rights being associated with at least one time slot defining the availability of associated content;
retrieving from at least one non-transitory computer-readable medium the access rights of all the contents currently available from the receiver for each of said users;
grouping the access rights previously retrieved for determining all the contents currently available from the receiver for the several users, such that the content acquired by a first user at the receiver is made available to a second, different user at the receiver;

generating signals for displaying on a display a menu presenting a list of all of said currently available contents for the grouped access rights, the list of contents being updated to indicate the availability of all content determined from time slots associated with access rights;

sending the display signals to the display;

receiving a selection of a content in the displayed list through a user interface; and authenticating at least one user of the plurality of users before presentation of a content selected in the displayed list.

17. The non-transitory computer-readable memory according to claim 16, wherein the display visually associates each content with an identity of a user who has made said content currently available from the receiver.

18. The non-transitory computer-readable memory according to claim 16, wherein the method further comprises: displaying the list of all of said currently available contents in a sequence according to payments made by the users for said contents.

19. The non-transitory computer-readable memory according to claim 16, wherein the method further comprises: downloading an available content into a memory of the receiver, and erasing said content from the memory of the receiver when a duration of availability of this content has elapsed.

* * * * *